US012701048B2

(12) United States Patent

Madhavan et al.

(10) Patent No.: US 12,701,048 B2

(45) Date of Patent: Aug. 4, 2026

(54) USING LONG-TERM FEATURES AND SHORT-TERM FEATURES TO FILTER CONTENT BEFORE A SELECTION PROCESS TO REDUCE LATENCY OF A CONTENT DISTRIBUTION SYSTEM

(71) Applicant: Maplebear Inc., San Francisco, CA (US)

(72) Inventors: Aakarsh Madhavan, Toronto (CA); Cheng Jia, San Jose, CA (US); Karuna Ahuja, San Francisco, CA (US); Shrikar Archak, Danville, CA (US)

(73) Assignee: Maplebear Inc., San Francisco, CA (US)

( * ) Notice: Subject to any disclaimer, the term of this patent is extended or adjusted under 35 U.S.C. 154(b) by 119 days.

(21) Appl. No.: 18/963,436

(22) Filed: Nov. 27, 2024

(65) Prior Publication Data

US 2026/0149637 A1    May 28, 2026

(51) Int. Cl.
H04L 41/0823 (2022.01)
G06Q 30/0251 (2023.01)
H04L 41/16 (2022.01)

(52) U.S. Cl.
CPC ..... H04L 41/0823 (2013.01); G06Q 30/0255 (2013.01); H04L 41/16 (2013.01)

(58) Field of Classification Search
CPC .. H04L 41/0823; H04L 41/16; G06Q 30/0255
See application file for complete search history.

(56) References Cited

U.S. PATENT DOCUMENTS

| | | | |
|---|---|---|---|
| 2017/0201432 A1* | 7/2017 | Balakrishnan | .......... H04L 12/12 |
| 2019/0018884 A1* | 1/2019 | Wakankar | ......... G06F 16/90324 |
| 2019/0018885 A1* | 1/2019 | Wakankar | ............. G06F 16/248 |
| 2021/0209491 A1* | 7/2021 | Liu | ........................... G06N 5/04 |
| 2023/0138410 A1* | 5/2023 | Le | ......................... G06F 16/248 |
| | | | 706/10 |

* cited by examiner

*Primary Examiner* — David R Lazaro
(74) *Attorney, Agent, or Firm* — Fenwick & West LLP

(57) ABSTRACT

Using long-term features and short-term features to reduce latency in providing recommendations is described. A user device in a session with an online system may request a recommendation. The online system identifies a set of recommendations based in part on the request. The online system retrieves long-term features for each of the set, and determines short-term features for each of the set. The short-term features are based on the session. The online system applies the long-term features and the short-term features to a scoring model that scores the recommendations of the set. The online system selects a subset of the set based on the scores, and provides the selected subset to a selector that selects a recommendation from the subset. The recommendation may be provided to the user device prior to expiration of a latency period associated with serving the recommendation request.

20 Claims, 5 Drawing Sheets

Figure 3B:
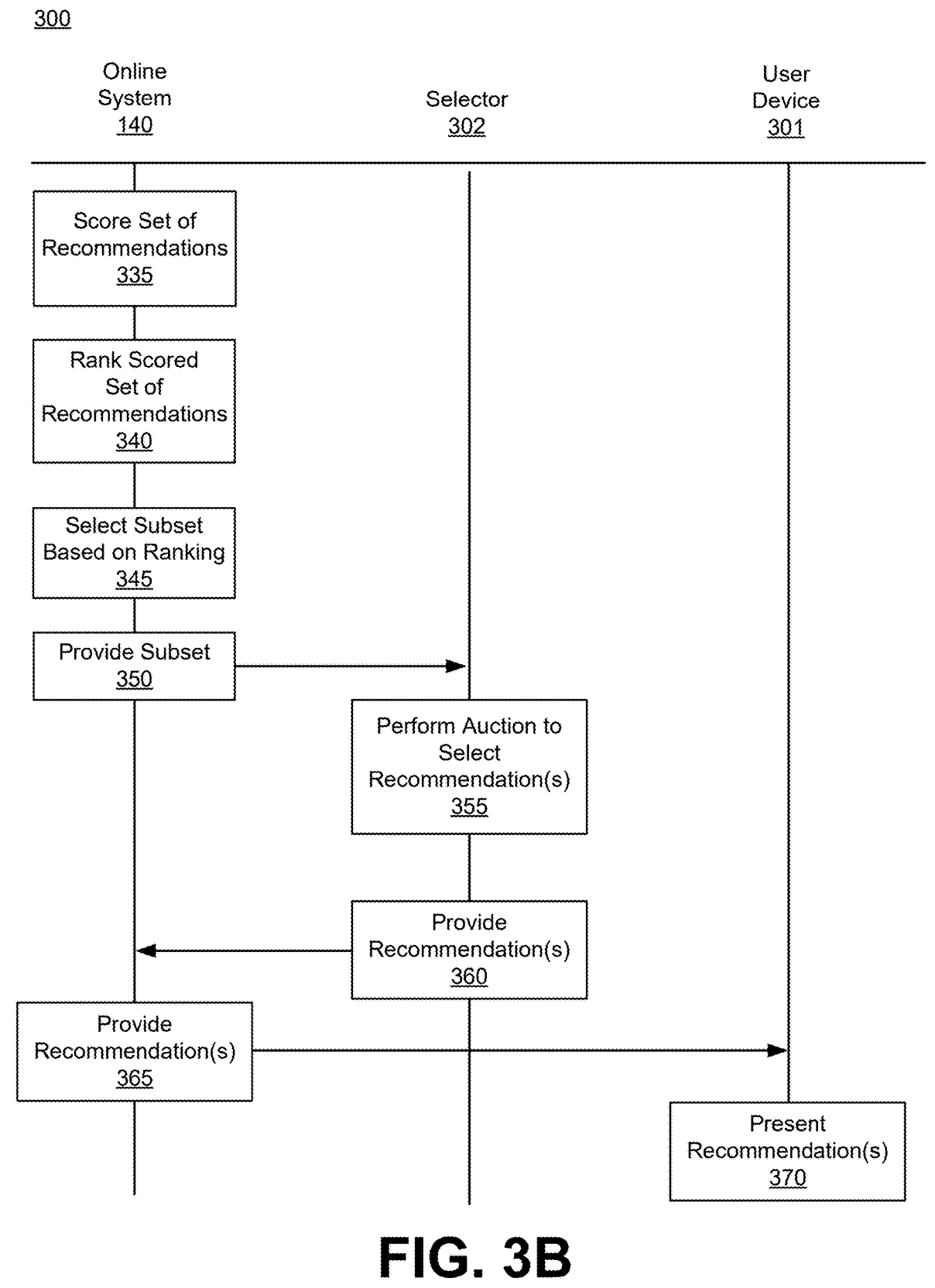

300

| Online System 140 | Selector 302 | User Device 301 |
|---|---|---|

Score Set of Recommendations
335

Rank Scored Set of Recommendations
340

Select Subset Based on Ranking
345

Provide Subset
350

Perform Auction to Select Recommendation(s)
355

Provide Recommendation(s)
360

Provide Recommendation(s)
365

Present Recommendation(s)
370

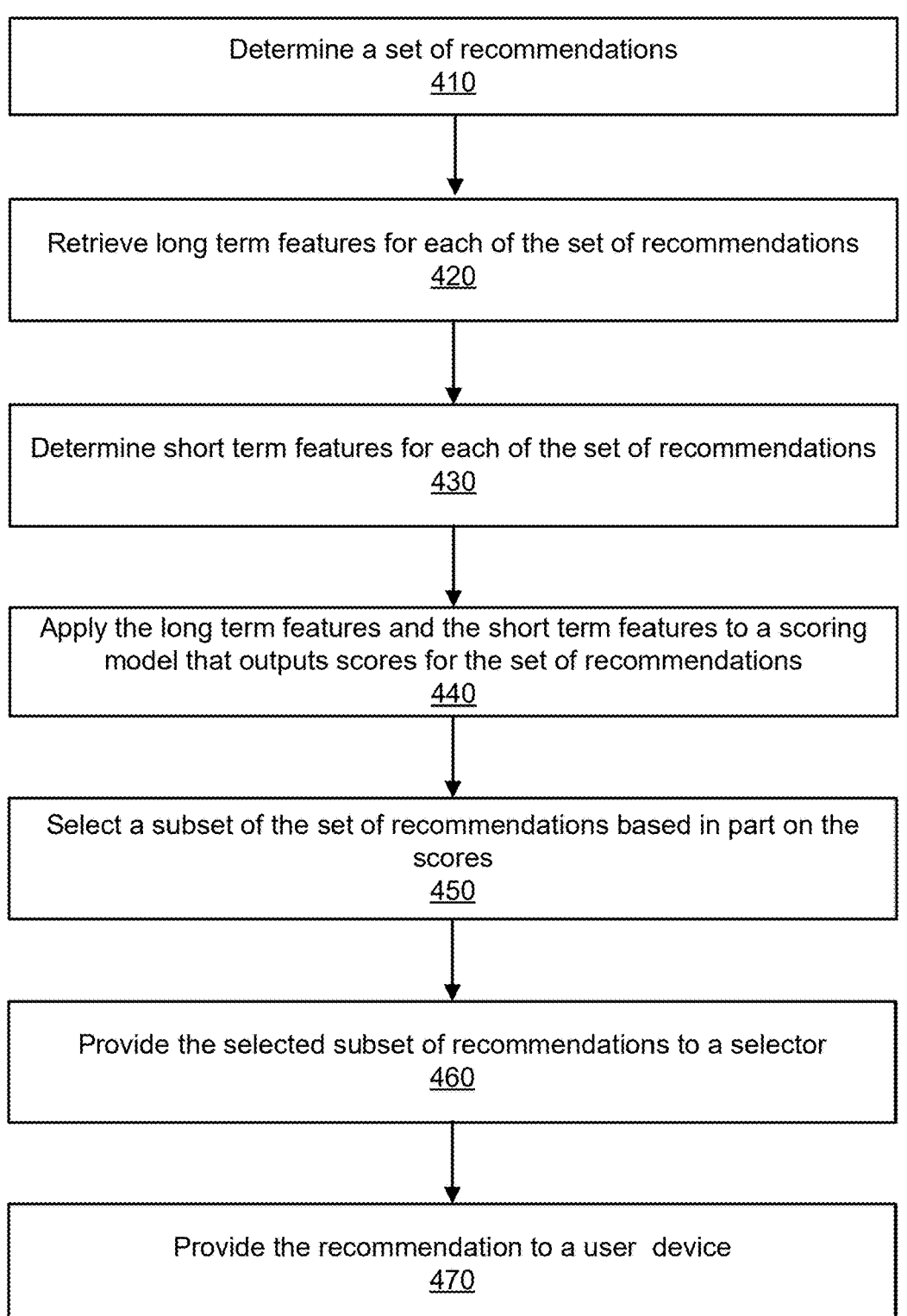

Determine a set of recommendations
410

Retrieve long term features for each of the set of recommendations
420

Determine short term features for each of the set of recommendations
430

Apply the long term features and the short term features to a scoring model that outputs scores for the set of recommendations
440

Select a subset of the set of recommendations based in part on the scores
450

Provide the selected subset of recommendations to a selector
460

Provide the recommendation to a user device
470

FIG. 4

USING LONG-TERM FEATURES AND SHORT-TERM FEATURES TO FILTER CONTENT BEFORE A SELECTION PROCESS TO REDUCE LATENCY OF A CONTENT DISTRIBUTION SYSTEM

BACKGROUND

Conventionally, when a device requests content from an online system, such as via a website, there is an allowable (or target) latency (such as 400 milliseconds) from the request to when the content is actually delivered to the device. During this latency period, the online system may select one or more recommendations using a selection process, which may include applying a machine learning model to score and rank the recommendations and then selecting one or more recommendations based on the ranking. But for conventional online systems, there can be very large numbers of recommendations from which to select for a particular user, which may be stored in a recommendations database. As the number of candidate recommendations increases, so does the time it takes to process those candidate content items to select a content item to provide to the device. Accordingly, processing large numbers of recommendations can negatively impact latency associated with responding to requests for content.

SUMMARY

To address the latency problem, an online system may first apply a coarse filtering of the recommendations for a particular user to generate a smaller number of candidate recommendations. This smaller number of candidate recommendations can then be scored and ranked in a selection process, which may then include more computationally intensive machine learning models. This two-part process of filtering the recommendations to generate a candidate set of recommendations to provide to the selection process helps to meet any latency requirements of the system. Moreover, by filtering the recommendations to reduce the number of candidate recommendations to be considered by the selection process, the selection process can spend more time scoring each candidate during the allowable latency period. This in turn enables more powerful (and complex) models to be used for scoring the candidates, thereby improving the recommendations that are provided without necessarily increasing the latency of the system.

In accordance with one or more aspects of the disclosure, long-term features and short-term features are used to reduce latency in providing recommendations. A user device (e.g., a user client device) may be in a session with an online system. During the session, the user device requests one or more recommendations for items from the online system. The requests for one or more recommendations may be due to, e.g., a page load event that is associated with a particular latency period.

The online system then identifies a set of recommendations for items based in part on the request. To identify the set of recommendations, the online system retrieves long-term features and short-term features for each of the set of recommendations. The long-term features describe a relevance of a recommendation to an attribute, preference, or historical action of the user. The short-term features are based on the session with the user device, and they describe an association between the recommendation and an activity that occurred during the current session between the user and the online system. The online system applies the long-term features and the short-term features to a scoring model that scores the recommendations of the set. The online system filters the recommendations by selecting a subset of the set of recommendations based on the scores. The online system provides this selected set of candidate recommendations to a selection process, or selector, that selects one or more recommendations from the set of candidates. The selection process may comprise an auction process in which each candidate recommendation is provided to a machine learning model, which outputs a prediction of a user engagement with the candidate recommendation, and then scores each candidate using an expected value computation using that prediction. The selected one or more recommendations may be provided to the user device along with the page of requested content.

Since initial set of recommendations can be quite large (e.g., tens of thousands or more), the online system is able to reduce latency in serving requested recommendations by reducing a size of the set of recommendations to a much smaller subset of recommendations, and having the selector process this much smaller subset of recommendations to select a recommendation to serve to the user device. The selector may perform an auction to select a recommendation from the subset in order to fulfill the request from the user device. The smaller number of recommendations in the subset reduces the time it takes to transmit recommendations to the selector and process those recommendations at the selector to select a recommendation for the user device.

BRIEF DESCRIPTION OF THE DRAWINGS

FIGS. 3A-3B form an example sequence diagram describing providing recommendations based in part on long-term features and short-term features, in accordance with some embodiments.

FIG. 4 is a flowchart for a method of using long-term features and short-term features to reduce latency in providing recommendations, in accordance with some embodiments.

DETAILED DESCRIPTION

Figure 1:
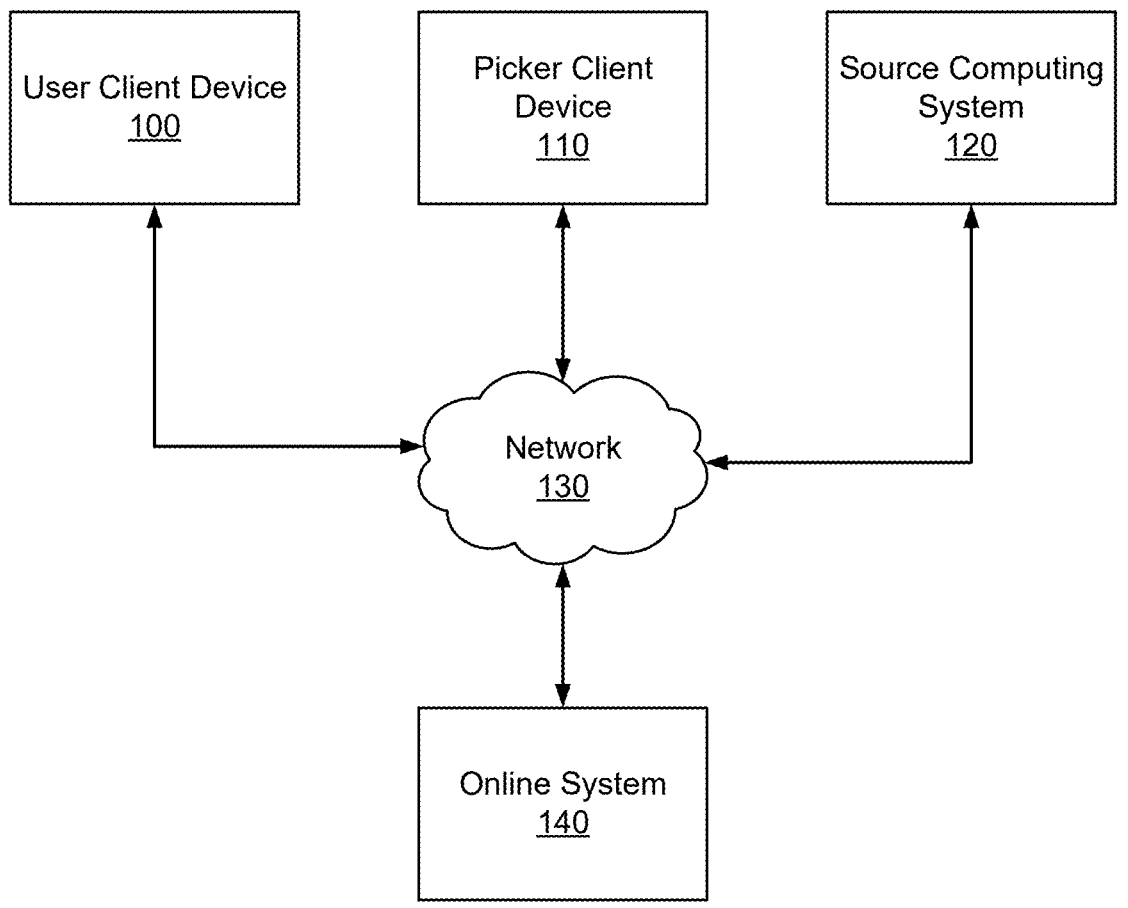
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. The user client device 100 may be referred to as a "user device." An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that a user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 presents, via the ordering interface, one or more recommendations for items. A recommendation for an item may be, e.g., an advertisement (e.g., sponsored) for an item, suggested item (e.g., not sponsored), etc. Recommendation slots within the ordering interface are used to present the one or more recommendations for items. A recommendation slot is a location within the ordering interface where a recommendation is presented. Each recommendation slot has a particular recommendation slot size and a corresponding position. In some embodiments, the ordering interface may include recommendation slots of different recommendation slot sizes. The ordering interface may include, e.g., collections (e.g., snacks, dairy, etc.) of recommendations that are associated with a particular source (e.g., Bob's Groceries at 100 Main St) location.

The user client device 100 may have a page load event for the ordering interface. A page load event is a request for content from the online system 140. The page load event may include requesting one or more recommendations from the online system 140. The page load event may be triggered as part of a session between the user client device 100 and the online system 140. For example, a user of the user client device 100 may be scrolling through content (e.g., items of the online catalog, recommendations, etc.) on the ordering interface. The content may be divided into content actively being presented and content in memory that is ready for presentation (but is not actively being presented). As the content is scrolled for presentation, the user client device 100 triggers page load events to request additional content from the online system 140 such that it can be placed in memory and be ready for display such that the user can immediately scroll into it (versus having to wait for it to load to display). In some embodiments, a user of the user client device 100 may perform an action in the ordering interface that, e.g., causes the user client device 100 to request a new web page, thereby triggering a page load event for the new web page. The user client device 100 receives the requested content (e.g., items, recommendations, etc.) from the online system 140, and updates the ordering interface accordingly.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission). In some embodiments, the source computing system 120 may provide recommendations (e.g., advertisements) for one or more items to the online system 140. In some embodiments, the recommendations may be specific to particular source locations and/or sources.

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 provides content that includes recommendations for items to user client devices (e.g., the user client device 100). For example, the user client device 100 may be in a session with the online system 140. An action (e.g., user scrolling) during the session may trigger a page load event, such that the user client device 100 requests one or more recommendations for items (and in some cases other content) from the online system 140. The page load event is associated with a particular latency period. The latency period is a time range (e.g., 400-500 milliseconds) between which one or more recommendations for items are requested and the requested one or more recommendations are received by the user client device 100. An example target latency period is less than 500 milliseconds. Responsive to the page load event, the online system 140 may identify a set of recommendations for items. In some embodiments, the online system 140 may identify the set of recommendations based on availability of items associated with recommendations at a source location associated with the session.

The online system 140 uses short-term features and long-term features to identify a subset of the set of recommendations. Short-term features are based on the session with the user client device 100 (e.g., based on items that have been added to an ordering list for the session). In contrast, long-term features are generally based on data (e.g., user data, order data, etc.) that has been previously collected over multiple sessions (e.g., over the last two weeks or more). The online system 140 applies the long-term features and the short-term features to a scoring model (e.g., a machine-learning model) that outputs scores for the set of recommendations. For example, the scoring model may output for each recommendation of the set of recommendations, a respective score. The online system 140 selects a subset of the set of recommendations based in part on the scores of the recommendations. For example, the online system 140 may rank the recommendations within the set according to their respective scores. The online system 140 may then select recommendations for the subset based on their ranking (e.g., selects recommendations having a score in the top 2%). The subset of recommendations may be much smaller in size than the set of recommendations, such as orders of magnitude.

The online system 140 provides the subset of recommendations to a selector. A selector may be, e.g., a component of the online system 140 or a third party system that performs an auction (e.g., advertisement auction) to select recommendations from the subset of recommendations to provide to the user client device 100 in response to the page load event. The selected recommendations are provided (e.g., by the online system 140 and/or the third party system) to the user client device 100. Having the selector processes the subset of recommendations (v. the substantially larger set of recommendations) results in quicker selection of the recommendation, which can then be provided to the user client device 100. In this manner, the online system 140 is able to respond to page load events with content that includes one or more recommendations over a time period that is less than or equal to the latency period.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

Figure 2:
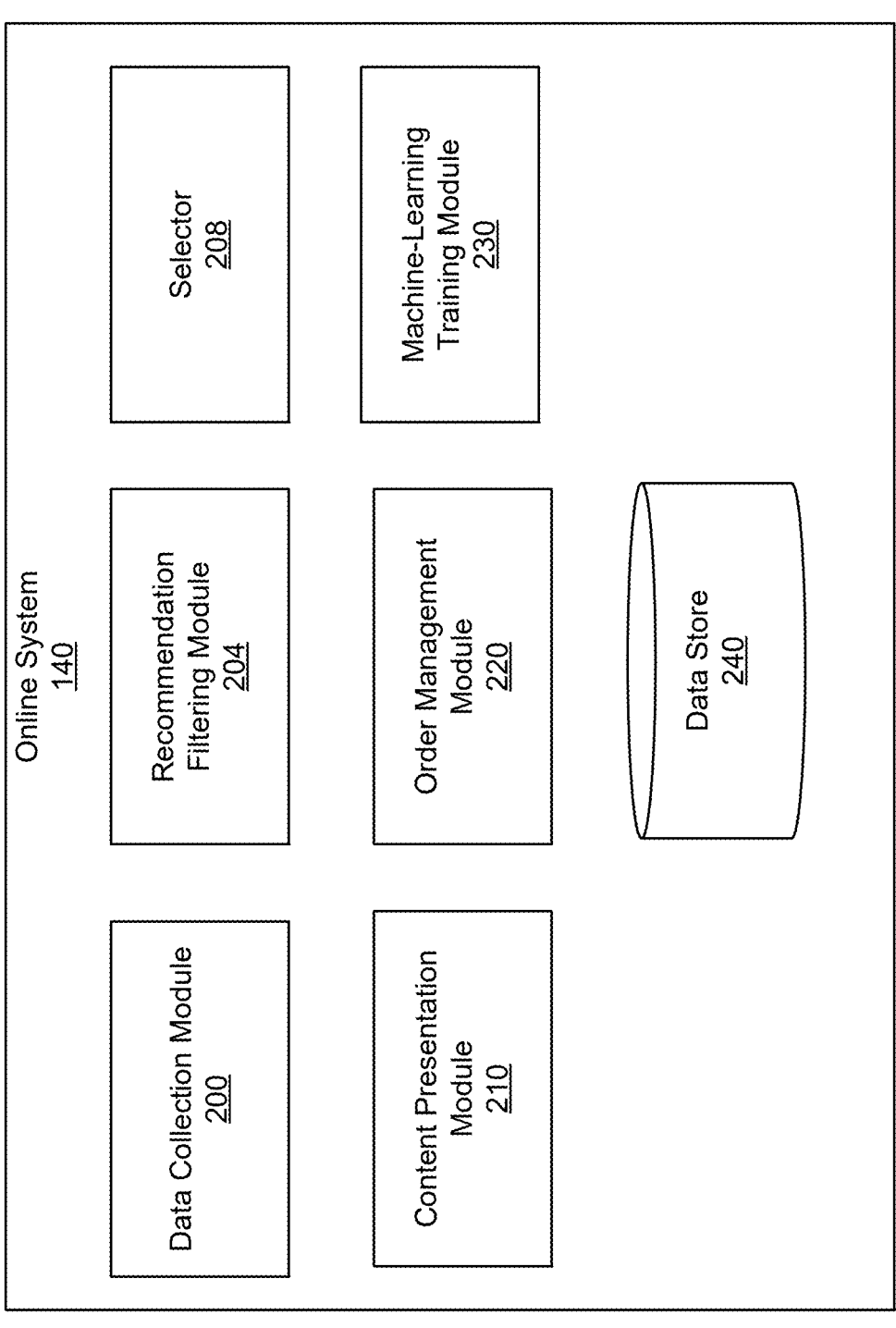
FIG. 2 illustrates an example system architecture for an online system, in accordance with some embodiments.

FIG. 2 illustrates an example system architecture for an online system 140, in accordance with some embodiments. The system architecture illustrated in FIG. 2 includes a data collection module 200, a recommendation filtering module 204, a selector 208, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention. For example, in some embodiments, the selector 208 may be part of a third party system that is separate and independent from the online system 140 (e.g., the third party system may be coupled via the network 130 to the online system 140).

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140. In some embodiments, the data collection module 200 may infer user data (e.g., favorite items) using data from multiple prior sessions (e.g., items purchased in prior orders).

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may also include information indicating whether any of the items purchased were due to conversions of presented recommendations for those items. Order data for an active session may include which items are in an ordering list of a user associated with the active session. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The data collection module 200 determines long-term features associated with users of the online system 140. Long-term features are generally based on data (e.g., user data, order data, and item data) that has been previously collected over multiple sessions. Long-term features may include relevance scores and/or conversion probability scores for recommendations for items. A relevance score is a prediction regarding how relevant a recommendation for an item is to a user. In contrast, a conversion probability score is a prediction regarding how probable that a user will select a presented recommendation for an item (e.g., for purchase). Long-term features may vary by user for the same recommendation for an item, as they are generated in part based on prior actions of the user.

The data collection module 200 may determine relevance scores using a relevancy model (e.g., machine-learning model). In some embodiments, the relevancy model uses item embeddings describing items and user embeddings describing users to determine relevance scores for recommendations for items. These item embeddings and user embeddings may be generated by separate machine-learning models and may be stored in the data store 240. The item embeddings and user embeddings may be based in part on user data, item data, and order data collected over many prior sessions. The relevancy model may compute cosine similarity between the user embeddings and the item embeddings to determine relevancy scores for recommendations for items for a particular user.

In some embodiments, the data collection module 200 may determine conversion probability for recommendations based in part on user data, item data, order data, or some combination thereof. For example, the data collection module 200 may apply, for a given user, inputs associated with the user (user data, item data, order data, or some combination thereof) and recommendations for items to a conversion probability model (e.g., machine learning model) that is configured to output conversion probability scores for each of the recommendations for items for that user.

The data collection module 200 computes the long-term features for different users for various recommendations. In some embodiments, the data collection module 200 may periodically (e.g., daily, monthly, etc.) determine long-term features for users. The data collection module 200 stores the long-term features for users in the data store 240. In this manner, long-term features for recommendations may be readily available for the online system 140 to use during sessions established with user client devices associated with various users.

The data collection module 200 determines short-term features associated with sessions. Short-term features are based on data from an active session with a user client device. An active session is a session the user client device is actively participating in with the online system 140. The data may include, e.g., item in the shopping cart during the session, item searched for during the session, or some combination thereof. A short-term feature for a recommendation for an item may be, e.g., a session score. A session score is a prediction of how relevant a recommendation of an item is to a set of events that occurred (e.g., actions that were performed by the user) during the session. During an active session, the data collection module 200 may apply the data and a set of recommendations (e.g., determined by the recommendation filtering module 204) to a session model (e.g., a machine-learning model) that outputs session scores for each recommendation of the set of recommendations. The session model may be trained, e.g., on training data examples that are obtained from historical user interactions of users with recommendations, each example including input features related to the user and the user's session, and an output label indicating whether or how the users interacted with the recommendation.

Short-term features are primarily used to identify relationships between items in an ordering list that exist irrespective of the user. For example, spaghetti noodles are commonly paired with marinara sauce in ordering lists. As such, having spaghetti noodles added to an ordering list, may increase a probability that marinara sauce would be of interest to the user. As such, the session model may score recommendations for marinara sauce higher than say, e.g., alfredo sauce. Moreover, users of the online system 140 typically have large ordering lists as they may shop for their weekly grocery needs, source ingredients for a recipe they want to make, etc. In these contexts, items in an ordering list often are related (e.g., part of a same recipe). In contrast, other conventional online platforms typically provide a one-off type shopping experience where items are purchased in a one-off manner and often are unrelated to each other (e.g., a fiction book and a curtain rod). As such, conventional online platforms typically do not use short-term signals in scoring recommendations to provide to their users.

The recommendation filtering module 204 reduces a number of recommendations that are passed to the selector 208 to help reduce latency in responding to requests for recommendations for items. The recommendation filtering module 204 receives requests for recommendations for items from user client devices. The requests may be responsive to, e.g., page load events occurring on the user client devices. Each of the page load events may be associated with a respective latency period in which the online system 140 is to select and provide requested recommendation for item. For example, responsive to a page load event associated with a user client device in a session with the online system 140, the recommendation filtering module 204 may identify a set of recommendations (e.g., that are stored in the data store 240). In some embodiments, the set of recommendations corresponds to a pool of all potential recommendations for items that may be provided to the user client device. In some embodiments, the set of recommendations is a subset of the pool of all possible recommendations. For example, the recommendation filtering module 204 may determine which recommendations of the pool of all possible recommendations are available at a source location associated with the session. The recommendation filtering module 204 may then form a set of recommendations that is composed of those that are available at the source location. In this manner, the recommendation filtering module 204 can determine a set of recommendations for items based on availability of the items at a source location associated with the session.

The recommendation filtering module 204 may use short-term features and long-term features to identify a subset of the set of recommendations. For example, responsive to a page load event of a user client device associated with a user, the recommendation filtering module 204 may instruct the data collection module 200 to determine short-term features for the set of recommendations. The recommendation filtering module 204 may also retrieve long-term features (e.g., that are associated with the user) for the set of recommendations from the data store 240.

The recommendation filtering module 204 scores sets of recommendations based in part on their associated long-term features and short-term features. The recommendation filtering module 204 uses a scoring model to score recommendations. The scoring model may be, e.g., a machine-learning model. In some embodiments, the scoring model may be, e.g., a light gradient boosting machine classifier machine-learning model. For a given set of recommendations, the recommendation filtering module 204 may apply long-term features of the set of recommendations and short-term features of the set of recommendations to the scoring model. The scoring model outputs for each recommendation of the set of recommendations, a respective score. The scoring model may be trained, e.g., on training data examples that are obtained from historical user interactions of users with recommendations, each example including the long-term features and the short-term features, and an output label indicating whether or how the users interacted with the recommendation.

Recommendation slot context describes how recommendations are placed in content for presentation (e.g., via a user client device). Recommendation slot context for a recommendation describes, e.g., a size of a recommendation slot (e.g., within an ordering interface of the user client device) and/or a position for the recommendation slot (e.g., within the ordering interface). Platform context describes properties of a user client device that interact with the online system 140. For example, platform context may indicate that a user client device has a particular display area, is presenting the ordering interface via a browser, is presenting the ordering interface via an app, is operating using a particular operating system, etc. Recommendation slot context and/or platform context may be received from user client devices. For example, the recommendation slot context and/or platform context may be part of a request for one or more recommendations for items from a user client device. In some embodiments, the recommendation filtering module 204 may retrieve, for a given user client device, platform context and/or recommendation slot context for that user client device from the data store 240.

In some embodiments, the scoring of the sets of recommendations may also be based on recommendation slot context and/or platform context of the user client device. For example, in addition to the short-term features and the long-term features, the recommendation filtering module 204 may also apply recommendation slot context and/or platform context to the scoring model to score each of the set of recommendations.

The recommendation filtering module 204 selects subsets of sets of recommendations based on scores of the recommendations. For example, given a set of scored recommendations, the recommendation filtering module 204 may select recommendations from the set that have at least a threshold score, such that the selected recommendations form a subset of the set of recommendations. In some embodiments, the recommendation filtering module 204 may rank the recommendations within the set according to their respective scores. The recommendation filtering module 204 may form the subset based on the ranked recommendations. For example, the recommendation filtering module 204 may form the subset from the top 20 (or some other number) recommendations. In another embodiment, the recommendation filtering module 204 forms the subset from recommendations that have at least a threshold score (e.g., top 5%). The recommendation filtering module 204 provides the subset of recommendations to the selector 208. Only the subset of recommendations is passed to the selector 208 and not the set of recommendations, as the set of recommendations is much larger (e.g., 10s of thousands of recommendations). The much smaller subset helps mitigate latency in responding to requests for recommendations from user client devices.

The selector 208 selects recommendations from subsets of recommendations for providing to user client devices. For a given request for one or more recommendations from a user client device, the selector 208 performs an auction to select the one or more recommendations from a subset of recommendations. Various entities (e.g., item manufactures, sources, etc.) bid to have their recommendations selected and sent to the user client devices. In some embodiments, the selector 208 may use information associated with a user (e.g., user data, order data, etc.) to target recommendations in the auction to the user. The selector 208 may perform one or more types of auctions (e.g., first-price auctions, second-price auctions, etc.). And the selector 208 may use one or more pricing models (e.g., cost-per mille, cost-per-click, cost-per-action, etc.) for the auctions. The selector 208 provides the selected one or more recommendations to the user client device. In the illustrated example, the selector 208 is part of the online system 140. In other embodiments, the selector 208 may be part of some third party system that is independent and separate from the online system 140.

As the selector 208 is processing the subset of recommendations and not the entire pool of all possible recommendations, the online system 140 is able to reduce latency between receiving a request for recommendations from a user client device and providing the requested recommendations.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. For example, the machine-learning training module 230 may train the relevancy model, the conversion probability model, the session model, the scoring model, or some combination thereof. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data, which may be referred to respectively as training user data, training picker data, training item data, and training order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

For example, the machine-learning training module 230 may train the scoring model by accessing a set of training examples including training user data and training order data for a set of training recommendations. The machine-learning training module 230 may apply the scoring model to the set of training examples to generate a training output corresponding to a set of training scores for the set of training recommendations. The machine-learning training module 230 may back-propagate one or more error terms obtained from one or more loss functions to update a set of parameters of the scoring model, and one or more of the error terms are based on a difference between a label applied to a test interaction of the set of training examples and the set of training scores. The machine-learning training module 230 may stop the back-propagation after the one or more loss functions satisfy one or more criteria.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

For example, the machine-learning training module 230 may retrain the scoring model by determining additional training examples using recommendations that were provided to user client devices and conversions associated with the recommendations. The machine-learning training module 230 may retrain the scoring model based in part on the additional training examples.

In some embodiments, instead of retaining the same scoring model, the machine-learning training module 230 trains a new scoring model using in part the additional training examples, and compares performance of the new scoring model to the existing scoring model. In some embodiments, the training for the new scoring model may use data collected over a particular time period (e.g., several weeks). And if the new scoring model is performing better than the existing scoring model, the machine-learning training module 230 replaces the existing scoring model with the new scoring model. The machine-learning training module 230 may determine performance of the models using various model metrics (e.g., receiving operating characteristic area under curve (ROC AUC), precision recall area under curve (PR AUC), logarithmic loss, etc.).

The data store 240 stores data used by the online system 140. For example, the data store 240 stores recommendations for items, user data, item data, order data, and picker data for use by the online system 140. The data store 240 also stores trained machine-learning models (e.g., the relevancy model, the conversion probability model, the session model, and the scoring model) trained by the machine-learning training module 230. For example, the data store 240 may store the set of parameters for a trained machine-learning model on one or more non-transitory, computer-readable media. The data store 240 uses computer-readable media to store data, and may use databases to organize the stored data. In some embodiments, the data store 240 also stores recommendation slot context and/or platform context associated with different user client devices.

Figure 3A:
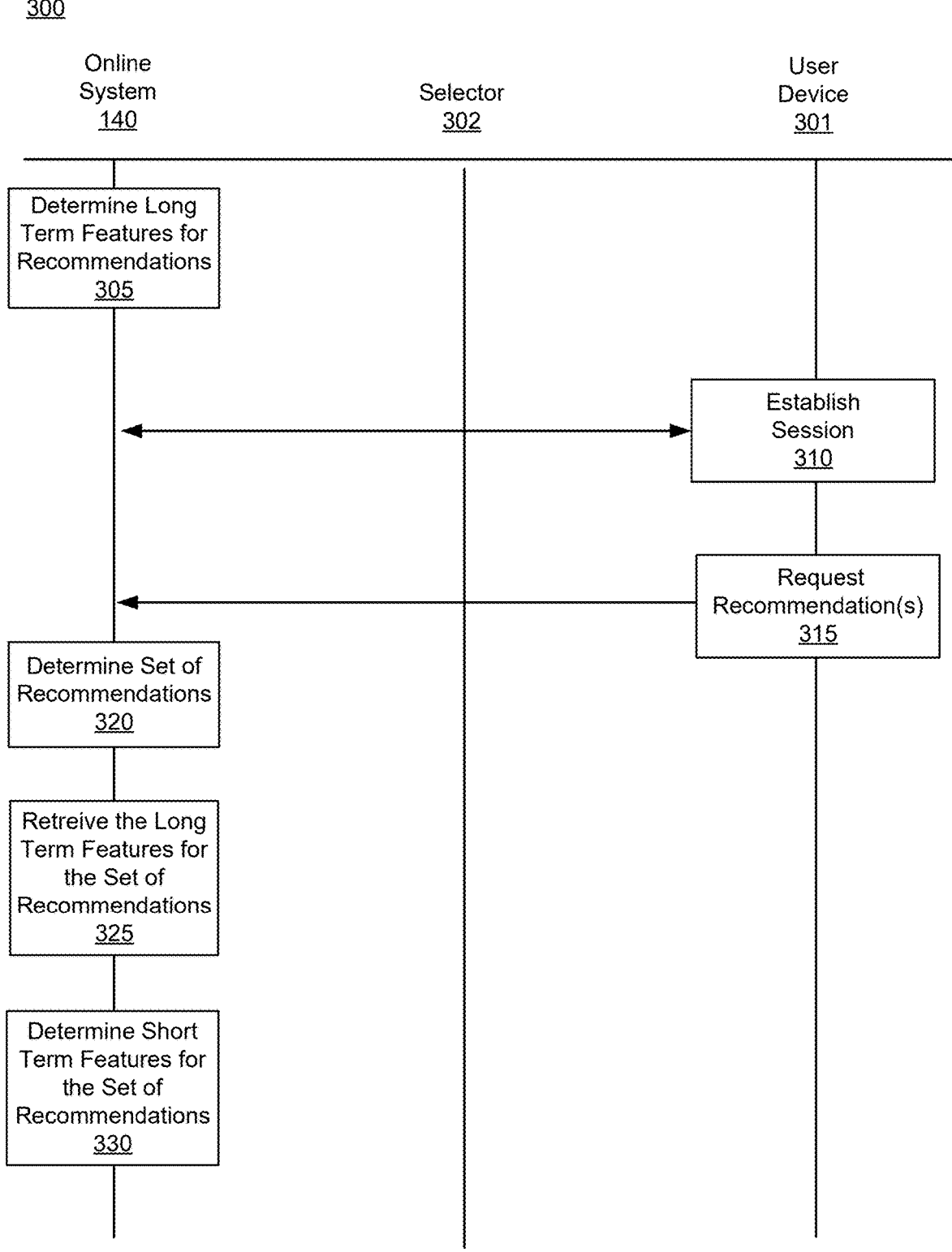

FIGS. 3A-3B form an example sequence diagram 300 describing providing recommendations based in part on long-term features and short-term features, in accordance with some embodiments. Alternative embodiments may include more, fewer, or different interactions from those illustrated in FIGS. 3A-3B, and the steps may be performed in a different order from that illustrated in FIGS. 3A-3B. The sequence diagram 300 describes some actions of a user device 301, a selector 302, and the online system 140. The user device 301 is an embodiment of the user client device 100. The selector 302 is an embodiment of the selector 208. Alternative embodiments may include more, fewer, or different components from those illustrated in FIGS. 3A-3B, and the functionality of each component may be divided between the components differently from the description below. For example, in some embodiments the selector 302 is part of the online system 140.

The online system 140 determines 305 long-term features for a pool of recommendations for items that could potentially be served to a user associated with the user device 301. The long-term features may be, e.g., relevance scores and/or conversion probability scores for some or all of the recommendations in the pool. For example, the online system 140 may apply item embeddings and user embedding associated with the user to a relevancy model. The relevancy model may output relevance scores for each of the recommendations in the pool. Alternatively, or in addition, the online system 140 may apply the recommendations and inputs (user data, item data, order data, etc.) associated with the user and to a conversion probability model. The conversion probability model outputs probability scores for each of the recommendations in the pool. The online system 140 stores the long-term features associated with the user for the recommendations in a data store (e.g., the data store 240).

Sometime later, the user device 301 establishes 310 a session with the online system 140. The session is associated with a source location. During the session, the user may view (e.g., via an ordering interface) one or more items from an online catalog of the online system 140. The online catalog may describe items that are available for purchase from the source location. The user may add one or more of the items to an ordering list during the session.

The user device 301 requests 315 one or more recommendations for items from the online system 140. For example, an action (e.g., user scrolling through displayed content, opening a new page, etc.) during the session may trigger a page load event, such that the user device 301 requests the one or more recommendations (and in some cases other content) from the online system 140. The page load event is associated with a particular latency period.

Responsive to the request (e.g., due to the page load event), the online system 140 identifies 320 a set of recommendations. In some embodiments, the online system 140 may determine the set of recommendations using information describing the recommendations in the pool of recommendations and/or retrieving some or all of the pool of recommendations from the data store. In some embodiments, the online system 140 determines the set of recommendations based on availability of items associated with recommendations at a source location associated with the session with the user device 301. For example, the online system 140 may determine the source location associated with the session. The online system 140 may then filter the pool of recommendations for items by availability of the items at the source location, such that the remaining recommendations form the set of recommendations.

The online system 140 retrieves 325 long-term features for the set of recommendations from the data store. The retrieved long-term features are for the set of recommendations and are associated with the user.

The online system 140 determines 330 short-term features for the set of recommendations. The online system 140 may collect data associated with the session, specifically, which items have been added to the ordering list, and some embodiments, what items were searched for during the session. The online system 140 may apply the collected data and the set of recommendations to a session model. The session model outputs session scores for each recommendation of the set of recommendations.

The online system 140 scores 335 each of the set of recommendations. The online system 140 applies at least the long-term features and the short-term features to a scoring model that outputs scores for the set of recommendations. In some embodiments, the scoring of the set of recommendations may also be based on recommendation slot context (e.g., recommendation slot size and/or corresponding position) and/or platform context of the user device 301. For example, in addition to the short-term features and the long-term features, the online system 140 may also apply recommendation slot context and/or platform context to the scoring model to score each recommendation of the set of recommendations.

The online system 140 ranks 340 the set of recommendations based on the scoring. For example, the online system 140 may rank the set of recommendations from highest score to lowest score.

The online system 140 selects 345 a subset of the set of recommendations based on the ranking. The online system 140 may, e.g., select the top 20 (or some other amount) recommendations from the set to be the subset. In other embodiments, the online system 140 may select the subset of the set of recommendations via some other process.

The online system 140 provides 350 the subset of recommendations to a selector 302. The selector 302 performs

355 an auction to select the one or more recommendations from a subset of recommendations. In the illustrated embodiment, the selector 302 provides 360 the one or more recommendations to the online system 140, and the online system 140 provides 365 the one or more recommendations to the user device 301. In other embodiments, the selector 302 may directly provide the user device 301 with the one or more recommendations. The user device 301 may update the ordering interface with the one or more recommendations, and present 370 the one or more recommendations.

Conventional online platforms do not use both long-term features and short-term features to reduce a number of recommendations that are processed by a selector. Instead, such conventional systems process the entire pool of recommendations which can take significant time and increase latency in responding to requests for recommendations from user devices. In contrast, as described herein, by reducing the number of recommendations that are provided to the selector 302, it not only reduces transmission time of recommendations provided to the selector 302, but also reduces processing time of the selector 302 to select recommendations. Accordingly, both short-term features and long-term features may be used to reduce latency in responding to user devices with requested recommendations.

FIG. 4 is a flowchart 400 for a method of using long-term features and short-term features to reduce latency in providing recommendations, in accordance with some embodiments. Alternative embodiments may include more, fewer, or different steps from those illustrated in FIG. 4, and the steps may be performed in a different order from that illustrated in FIG. 4. These steps may be performed by an online system (e.g., online system 140). Additionally, each of these steps may be performed automatically by the online system without human intervention.

The online system determines 410 a set of recommendations. The online system 140 may determine the set of recommendations from recommendations that are stored in a data store (e.g., the data store 240). The online system 140 may determine the set of recommendations responsive to a request for one or more recommendations for items from a user device (e.g., the user client device 100) that occurs during a session between the online system and the user device. For example, a user of the user device may perform an action (e.g., scroll content) that results in a page load event, where the user device sends the request for the one or more recommendations to the online system. The page load event is associated with a target latency period (e.g., less than 500 milliseconds) to provide content to the user device.

The online system retrieves 420 long-term features for each of the set of recommendations. The online system may have pre-computed (at some time prior to the session) the long-term features for the set of recommendations and stored them in a data store (e.g., the data store 240). The online system retrieves the long-term features (e.g., relevance scores and/or conversion probability scores) for the set of recommendations from the data store.

The online system determines 430 short-term features for each of the set of recommendations. The short-term features are based on the session. The online system may collect data associated with the session, specifically, which items have been added to an ordering list, and some embodiments, what items were searched for during the session. The online system may apply the data and the set of recommendations to a session model. The session model outputs session scores (i.e., the short-term features) for each recommendation of the set of recommendations.

The online system applies 440 the long-term features and the short-term features to a scoring model that outputs scores for the set of recommendations. In some embodiments, in addition to the short-term features and the long-term features, the online system may also apply recommendation slot context and/or platform context to the scoring model to score each of a set of recommendations.

The online system selects 450 a subset of the set of recommendations based in part on the scores. The online system 140 may rank the set of recommendations, and select recommendations from the set to form the subset based on the ranking. For example, the online system may, e.g., select the top 20 (or some other amount) recommendations from the set to be the subset, recommendations having at least a threshold score to form the subset, etc.

The online system provides 460 the selected subset of recommendations to a selector. The selector selects one or more recommendations from the subset to fulfill the request for a recommendation from the user device. To select the one or more recommendations from the subset of recommendations, the selector may perform one or more auctions.

The online system provides 470 the one or more recommendations to the user device. The reduction in the number of recommendations that are passed to the selector for the auction helps mitigate a total time to identify recommendations for the user device. Accordingly, the online system is better able to provide recommendations in response to requests from user devices prior to expiration of latency periods for providing content. In this manner, the online system may provide recommendations to user devices within the target latency period, even though the initial set of recommendations may be quite large (e.g., 10s of thousands).

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality.

Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

responsive to a page load event that is part of a session between the computer system and a user device of a user, identifying a set of recommendations, wherein the page load event is associated with a target latency period;

retrieving long-term features for each of the set of recommendations, wherein each of the long-term features describes a relationship between the user and a recommendation of the set of recommendations;

generating short-term features for each of the set of recommendations, wherein each of the short-term features describes a relationship between the session and a recommendation of the set of recommendations;

applying the long-term features and the short-term features to a scoring model that outputs scores for each of the set of recommendations;

selecting a set of candidate recommendations from the set of recommendations based in part on the scores;

providing the selected candidate recommendations to a selector, wherein the selector selects one or more of the candidate recommendations; and

providing the selected one or more candidate recommen- dations to the user device before expiration of the target latency period, wherein providing the selected one or more candidate recommendations to the user device causes the user device to display the one or more candidate recommendations.

2. The method of claim 1, wherein applying the long-term features and the short-term features to the scoring model comprises:

identifying a platform context of the user device; and
applying the long-term features, the short-term features, and the platform context to the scoring model that outputs the scores for the set.

3. The method of claim 1, wherein applying the long-term features and the short-term features to the scoring model comprises:

identifying a recommendation slot context for an ordering interface of the user device; and
applying the long-term features, the short-term features, and the recommendation slot context to the scoring model that outputs the scores for the set,
wherein the recommendation provided to the user device is presented via the ordering interface.

4. The method of claim 1, wherein generating the short- term features for each of the set of recommendations com- prises:

using a session model to generate session scores for each of the set of recommendations, wherein the generated session scores are the short-term features.

5. The method of claim 1, further comprising:

before the session, generating relevance scores for each of the set using user embeddings and item embeddings, wherein retrieving the long-term features comprises retrieving the generated relevance scores.

6. The method of claim 1, further comprising:

before the session, generating conversion probability scores for the set, wherein retrieving the long-term features comprises retrieving the generated conversion probability scores.

7. The method of claim 1, further comprising:

generating the set of recommendations based on avail- ability of items associated with recommendations at a source location associated with the session.

8. The method of claim 1, wherein the scoring model is a machine-learning model that was trained by:

accessing a set of training examples including training user data and training order data for a set of training recommendations;
applying the scoring model to the set of training examples to generate a training output corresponding to a set of training scores for the set of training recommendations;
back-propagating one or more error terms obtained from one or more loss functions to update a set of parameters of the scoring model, and one or more of the error terms are based on a difference between a label applied to a test interaction of the set of training examples and the set of training scores; and
stopping the back-propagation after the one or more loss functions satisfy one or more criteria.

9. The method of claim 1, further comprising:

generating additional training examples using recommen- dations that were provided to user devices and conver- sions associated with the recommendations; and
retraining the scoring model based in part on the addi- tional training examples.

10. A computer program product comprising a non- transitory computer readable storage medium having instructions encoded thereon that, when executed by a processor of a computer system, cause the computer system to perform steps comprising:

responsive to a page load event that is part of a session between the computer system and a user device of a user, identifying a set of recommendations, wherein the page load event is associated with a target latency period;
retrieving long-term features for each of the set of rec- ommendations, wherein each of the long-term features describes a relationship between the user and a recom- mendation of the set of recommendations;
generating short-term features for each of the set of recommendations, wherein each of the short-term fea- tures describes a relationship between the session and a recommendation of the set of recommendations;
applying the long-term features and the short-term fea- tures to a scoring model that outputs scores for each of the set of recommendations;
selecting a set of candidate recommendations from the set of recommendations based in part on the scores;
providing the selected candidate recommendations to a selector, wherein the selector selects one or more of the candidate recommendations; and
providing the selected one or more candidate recommen- dations to the user device before expiration of the target latency period, wherein providing the selected one or more candidate recommendations to the user device causes the user device to display the one or more candidate recommendations.

11. The computer program product of claim 10, wherein applying the long-term features and the short-term features to the scoring model comprises:

identifying a platform context of the user device; and
applying the long-term features, the short-term features, and the platform context to the scoring model that outputs the scores for the set.

12. The computer program product of claim 10, wherein applying the long-term features and the short-term features to the scoring model comprises:

identifying a recommendation slot context for an ordering interface of the user device; and
applying the long-term features, the short-term features, and the recommendation slot context to the scoring model that outputs the scores for the set,
wherein the recommendation provided to the user device is presented via the ordering interface.

13. The computer program product of claim 10, wherein generating the short-term features for each of the set of recommendations comprises:

using a session model to generate session scores for each of the set of recommendations, wherein the generated session scores are the short-term features.

14. The computer program product of claim 10, further comprising encoded instructions that when executed cause the computer system to perform steps comprising:

before the session, generating relevance scores for each of the set using user embeddings and item embeddings, wherein retrieving the long-term features comprises retrieving the generated relevance scores.

15. The computer program product of claim 10, further comprising encoded instructions that when executed cause the computer system to perform steps comprising:

before the session, generating conversion probability scores for the set, wherein retrieving the long-term features comprises retrieving the generated conversion probability scores.

16. The computer program product of claim 10, further comprising encoded instructions that when executed cause the computer system to perform steps comprising:

generating the set of recommendations based on availability of items associated with recommendations at a source location associated with the session.

17. The computer program product of claim 10, wherein the scoring model is a machine-learning model that was trained by:

accessing a set of training examples including training user data and training order data for a set of training recommendations;

applying the scoring model to the set of training examples to generate a training output corresponding to a set of training scores for the set of training recommendations;

back-propagating one or more error terms obtained from one or more loss functions to update a set of parameters of the scoring model, and one or more of the error terms are based on a difference between a label applied to a test interaction of the set of training examples and the set of training scores; and stopping the back-propagation after the one or more loss functions satisfy one or more criteria.

18. The computer program product of claim 10, further comprising encoded instructions that when executed cause the computer system to perform steps comprising:

generating additional training examples using recommendations that were provided to user devices and conversions associated with the recommendations; and retraining the scoring model based in part on the additional training examples.

19. A computer system comprising:

a processor; and a non-transitory computer readable storage medium having instructions encoded thereon that, when executed by the processor, cause the computer system to perform steps comprising:

responsive to a page load event that is part of a session between the computer system and a user device of a user, identifying a set of recommendations, wherein the page load event is associated with a target latency period;

retrieving long-term features for each of the set of recommendations, wherein each of the long-term features describes a relationship between the user and a recommendation of the set of recommendations;

generating short-term features for each of the set of recommendations, wherein each of the short-term features describes a relationship between the session and a recommendation of the set of recommendations;

applying the long-term features and the short-term features to a scoring model that outputs scores for each of the set of recommendations;

selecting a set of candidate recommendations from the set of recommendations based in part on the scores;

providing the selected candidate recommendations to a selector, wherein the selector selects one or more of the candidate recommendations; and providing the selected one or more candidate recommendations to the user device before expiration of the target latency period, wherein providing the selected one or more candidate recommendations to the user device causes the user device to display the one or more candidate recommendations.

20. The computer system of claim 19, wherein applying the long-term features and the short-term features to the scoring model comprises:

identifying a platform context of the user device; and applying the long-term features, the short-term features, and the platform context to the scoring model that outputs the scores for the set.

\* \* \* \* \*